(12) United States Patent
Johnson, Jr. et al.

(10) Patent No.: US 12,362,566 B2
(45) Date of Patent: Jul. 15, 2025

(54) SYSTEMS AND METHODS FOR RAPID ACTIVATION AND SYNCHRONIZATION OF DISPATCHABLE POWER SOURCES

(71) Applicant: Flexgen Power Systems, Inc., Durham, NC (US)

(72) Inventors: Robert William Johnson, Jr., Raleigh, NC (US); Tony Olivo, Raleigh, NC (US)

(73) Assignee: FlexGen Power Systems, LLC, Durham, NC (US)

( * ) Notice: Subject to any disclaimer, the term of this patent is extended or adjusted under 35 U.S.C. 154(b) by 0 days.

(21) Appl. No.: 16/333,149

(22) PCT Filed: Sep. 18, 2017

(86) PCT No.: PCT/US2017/052065
§ 371 (c)(1),
(2) Date: Mar. 13, 2019

(87) PCT Pub. No.: WO2018/053429
PCT Pub. Date: Mar. 22, 2018

(65) Prior Publication Data
US 2019/0214827 A1    Jul. 11, 2019

Related U.S. Application Data

(60) Provisional application No. 62/553,417, filed on Sep. 1, 2017, provisional application No. 62/396,382, filed on Sep. 19, 2016.

(30) Foreign Application Priority Data

Apr. 26, 2017   (GB) ..................... 1706636

(51) Int. Cl.
H02J 3/40    (2006.01)
H02J 3/28    (2006.01)
(Continued)

(52) U.S. Cl.
CPC ........ *H02J 3/32* (2013.01); *H02J 3/28* (2013.01); *H02J 3/30* (2013.01); *H02J 3/40* (2013.01); *H02J 3/46* (2013.01); *H02J 3/48* (2013.01)

(58) Field of Classification Search
CPC ..................................... H02J 3/28; H02J 3/40
(Continued)

(56) References Cited

U.S. PATENT DOCUMENTS 5,552,640 A * 9/1996 Sutton ............... H02P 9/04
290/40 B
6,717,282 B1 * 4/2004 Maxwell ............ F02N 11/04
290/40 R (Continued)

FOREIGN PATENT DOCUMENTS

EP    2161443    3/2010
EP    2325970    5/2011
(Continued)

OTHER PUBLICATIONS

International Search Report and Written Opinion, PCT/US2017/052065, Jan. 8, 2018; 13 pages.
(Continued)

*Primary Examiner* — Daniel Kessie
*Assistant Examiner* — Brian K Baxter
(74) *Attorney, Agent, or Firm* — Stanek Lemon Crouse & Meeks, PA

(57) ABSTRACT

A system includes a switch configured to couple a generator to a utility grid, a first converter having a first port coupled to the generator, a second converter having a first port coupled to a second port of the first converter and a second port coupled to the utility grid, and a controller configured to control the switch and the first and second converters. The controller may be configured to cause the first and second converters to provide power to the utility grid from the (Continued)

generator after the generator starts and before a state of the generator meets a predetermined criterion.

14 Claims, 8 Drawing Sheets

(51) Int. Cl.
    *H02J 3/30*     (2006.01)
    *H02J 3/32*     (2006.01)
    *H02J 3/46*     (2006.01)
    *H02J 3/48*     (2006.01)
(58) Field of Classification Search
    USPC .......................................................... 307/82
    See application file for complete search history.

(56) References Cited

U.S. PATENT DOCUMENTS

| | | | | |
|---|---|---|---|---|
| 6,825,575 | B1 | 11/2004 | Edelson | |
| 8,084,892 | B2* | 12/2011 | Yasugi | H02J 3/005 |
| | | | | 307/125 |
| 8,174,150 | B2* | 5/2012 | Delmerico | H02M 5/4585 |
| | | | | 307/151 |
| 9,388,753 | B2* | 7/2016 | Prochaska | F02D 29/06 |
| 2002/0080633 | A1* | 6/2002 | Kang | F02C 7/08 |
| | | | | 363/71 |
| 2002/0175660 | A1* | 11/2002 | King | H02J 9/08 |
| | | | | 322/4 |
| 2003/0007369 | A1* | 1/2003 | Gilbreth | H02J 1/14 |
| | | | | 363/35 |
| 2004/0135436 | A1* | 7/2004 | Gilbreth | H02J 1/10 |
| | | | | 307/18 |
| 2004/0245783 | A1* | 12/2004 | Gilbreth | H02J 1/10 |
| | | | | 290/52 |
| 2005/0200337 | A1* | 9/2005 | Schreiber | H02J 3/1842 |
| | | | | 323/205 |
| 2005/0201127 | A1* | 9/2005 | Tracy | H02J 9/062 |
| | | | | 363/37 |
| 2006/0017328 | A1* | 1/2006 | Bryde | H02J 9/062 |
| | | | | 307/64 |
| 2007/0273155 | A1* | 11/2007 | Barton | H02J 3/1892 |
| | | | | 290/44 |
| 2009/0021079 | A1* | 1/2009 | Johnson, Jr. | H02J 9/066 |
| | | | | 307/68 |
| 2009/0146500 | A1* | 6/2009 | Jones | H02J 3/381 |
| | | | | 290/44 |
| 2009/0218820 | A1* | 9/2009 | Gertmar | H02J 3/42 |
| | | | | 290/44 |
| 2010/0002475 | A1* | 1/2010 | Folts | H02J 9/062 |
| | | | | 363/37 |
| 2010/0277137 | A1* | 11/2010 | Zhao | H02P 29/0241 |
| | | | | 322/99 |
| 2011/0140430 | A1 | 6/2011 | Ritter et al. | |
| 2011/0140438 | A1 | 6/2011 | Delmerico et al. | |
| 2012/0043759 | A1* | 2/2012 | Bjork | H02J 3/46 |
| | | | | 290/44 |
| 2012/0068541 | A1* | 3/2012 | Anderson | H02J 9/061 |
| | | | | 307/66 |
| 2012/0217824 | A1 | 8/2012 | Gupta et al. | |
| 2013/0002022 | A1* | 1/2013 | McMullen | H02J 3/30 |
| | | | | 307/46 |
| 2013/0057227 | A1* | 3/2013 | Aurtenetxea | H02H 7/06 |
| | | | | 322/28 |
| 2013/0127626 | A1* | 5/2013 | Yoo | H01M 10/488 |
| | | | | 340/636.19 |
| 2013/0176751 | A1* | 7/2013 | Olea | H02M 3/335 |
| | | | | 363/16 |
| 2013/0184884 | A1 | 7/2013 | More et al. | |
| 2013/0264865 | A1* | 10/2013 | Sugeno | H02J 7/00712 |
| | | | | 307/9.1 |
| 2014/0070535 | A1 | 3/2014 | Wagoner et al. | |
| 2014/0103727 | A1 | 4/2014 | Taimela et al. | |
| 2014/0103886 | A1 | 4/2014 | Heier et al. | |
| 2014/0152009 | A1* | 6/2014 | Meisner | H02P 9/04 |
| | | | | 290/7 |
| 2014/0204630 | A1 | 7/2014 | Wagoner et al. | |
| 2014/0265327 | A1* | 9/2014 | Teichmann | H02P 9/04 |
| | | | | 290/31 |
| 2015/0061298 | A1* | 3/2015 | Panosyan | F03D 7/0272 |
| | | | | 477/185 |
| 2015/0145251 | A1 | 5/2015 | Wagoner et al. | |
| 2015/0180393 | A1* | 6/2015 | Tesch | H02P 9/305 |
| | | | | 307/87 |
| 2015/0219055 | A1* | 8/2015 | Desabhatla | H02P 9/08 |
| | | | | 290/31 |
| 2015/0249401 | A1* | 9/2015 | Eriksen | H02M 5/4585 |
| | | | | 290/44 |
| 2016/0190806 | A1* | 6/2016 | Taimela | H02J 3/00 |
| | | | | 307/62 |
| 2017/0353036 | A1* | 12/2017 | Gil Lizarbe | H02J 3/386 |
| 2018/0145620 | A1* | 5/2018 | Zhang | F02C 9/54 |
| 2018/0287392 | A1* | 10/2018 | Maedako | H02J 3/46 |
| 2019/0052089 | A1* | 2/2019 | Ganireddy | H02J 9/08 |
| 2019/0379269 | A1* | 12/2019 | Huntgeburth | H05K 7/20145 |

FOREIGN PATENT DOCUMENTS

| | | |
|---|---|---|
| EP | 2339714 | 6/2011 |
| EP | 2341607 | 7/2011 |

OTHER PUBLICATIONS

Combined Search and Examination Report; GB 1706636.6; May 30, 2017; 6 pages.

Examination Report: GB 1706636.6; Jul. 7, 2017; 3 page.

Examination Report, GB 1706636.6; Oct. 2, 2017; 3 page.

\* cited by examiner

SYSTEMS AND METHODS FOR RAPID ACTIVATION AND SYNCHRONIZATION OF DISPATCHABLE POWER SOURCES

RELATED APPLICATIONS

The present application is a 35 U.S.C. § 371 national phase application of PCT International Application No. PCT/US2017/052065, having an international filing date of Sep. 18, 2017, and claiming priority to U.S. Provisional Application Nos. 62/396,382; filed Sep. 19, 2016 and 62/553,417; filed Sep. 1, 2017 and Great Britain Application No. 1706636.6 filed Apr. 26, 2017, the disclosures of which are incorporated herein by reference in their entireties. The above PCT International Application was published as International Publication No. WO 2018/053429 A1.

BACKGROUND

Power shortages have become commonplace throughout the world. As renewable energy sources have become an increasing percentage of the total utility grid power, the variability of the power output of these renewable sources can have a destabilizing effect on the utility grid. As the percentage of traditional rotational generation decreases, there is some concern for the utility grid's ability to clear faults and support high inrush loads. To avoid power interruptions, dispatchable generation sources that are available in short notice and deliver required power have become more desirable.

Power plants that can be dispatched within minutes to overcome power shortages are important assets for balancing electrical system loads and maintaining utility grid stability. It typically takes several minutes to start one of these dispatchable resources and for it to be connected to the utility grid. The choice of generating technology affects the time required for a power plant to startup and reach full load. Current state-of-the-art combustion engine power plants typically can start and reach full load in less than 10 minutes.

Types of engines that can power a rapid-starting dispatchable source include diesel, spark-ignited gas and gas turbine engines. The process to bring a generation asset on line typically begins with starting the engine. Once started, the engine speed is increased to synchronous speed and voltage is increased to match the utility grid voltage. Once the generator is synchronized with the utility grid, a contactor is closed to connect the generator to the utility grid and the generator load is ramped up to 100%. FIG. 1 is an example of an aggressive starting of a gas generator. Several of the aggressive methods may include advanced throttle control and preheating of engine.

For power to be transferred from a generator to the utility grid, the generator should produce a line voltage, frequency, phase sequence, phase angle and waveform matching the utility grid, as any significant mismatch at the time connection to the utility grid may result in extremely high currents and generator damage. As shown in FIG. 1, a first interval is a crank time for starting the engine. If the engine fails to start, this interval may be extended by one or more additional retries. A crank cycle may include an initial 15 second crank interval followed by a 7 second rest period, followed by 5 cycles of 7 second crank intervals interspersed with 7 second rest periods. If the engine fails to start on the first crank cycle, significant time can be lost waiting for the engine to start.

Once the engine starts, the engine may be ramped up to synchronous speed over the next 10 seconds. Matching the generator output to the utility grid in voltage, frequency and phase may require 15 seconds. Once the generator is matched to the utility grid, the generator output is connected directly to the utility grid. As shown, the generator loading may be gradually increased to 100% over the next 30 seconds. Thus, the illustrated process to bring the generator on line may take approximately 60 seconds if the engine starts on the first attempt.

SUMMARY OF THE INVENTION

According to some embodiments of the inventive subject matter, a system includes a switch configured to couple a generator to a utility grid, a first converter having a first port coupled to the generator, a second converter having a first port coupled to a second port of the first converter and a second port coupled to the utility grid, and a controller configured to control the switch and the first and second converters. The controller may be configured to cause the first and second converters to provide power to the utility grid from the generator before a state of the generator meets a predetermined criterion.

In some embodiments, the controller may be configured to close the switch to directly connect the generator to the utility grid responsive to the state of the generator meeting the predetermined criterion. The predetermined criterion may include a synchronization of the generator to the utility grid. According to further aspects, the controller may be configured to start the generator responsive to a command and to cause the first and second converters to provide power to the utility grid from the generator responsive to the command.

In some embodiments, the second port of the first converter may be coupled to the first port of the second converter by a DC bus and the controller may be configured to cause the second converter to provide power to the utility grid from an energy storage device coupled to the DC bus until the generator has started and provides a predetermined amount of power. In further embodiments, the controller may be further configured to maintain substantially zero current transfer between the energy storage device and the DC bus after the generator is providing the predetermined amount of power.

According to further embodiments, methods include coupling a generator to a utility grid via a series combination of a first converter coupled to the generator and a second converter coupled between the first converter and the utility grid. The methods further include providing power to the utility grid from the generator before a state of a generator meets a predetermined criterion. The methods may also include closing a switch to directly connect the generator to the utility grid responsive to the state of the generator meeting the predetermined criterion. The methods may further include starting the generator responsive to a command and causing the first and second converters to provide power to the utility grid from the generator responsive to the command.

DETAILED DESCRIPTION

Figure 1:
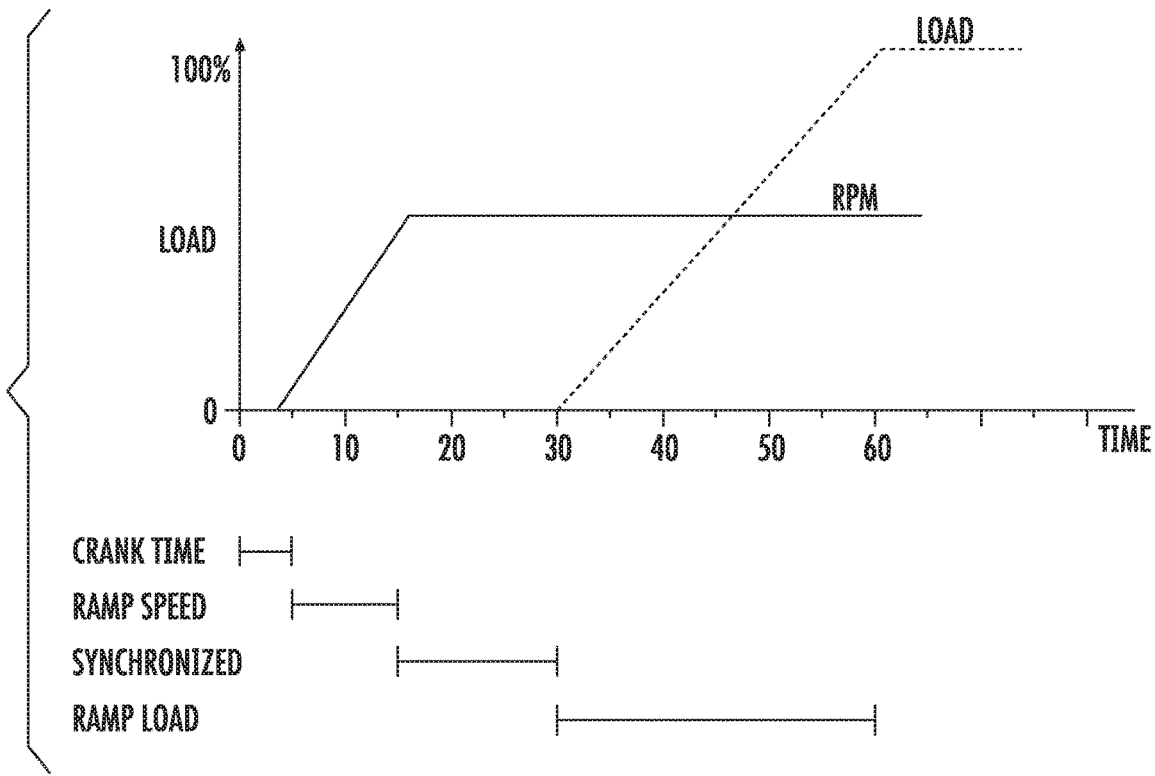
FIG. 1 is a graph illustrating a conventional starting sequence for bringing a generator on line.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
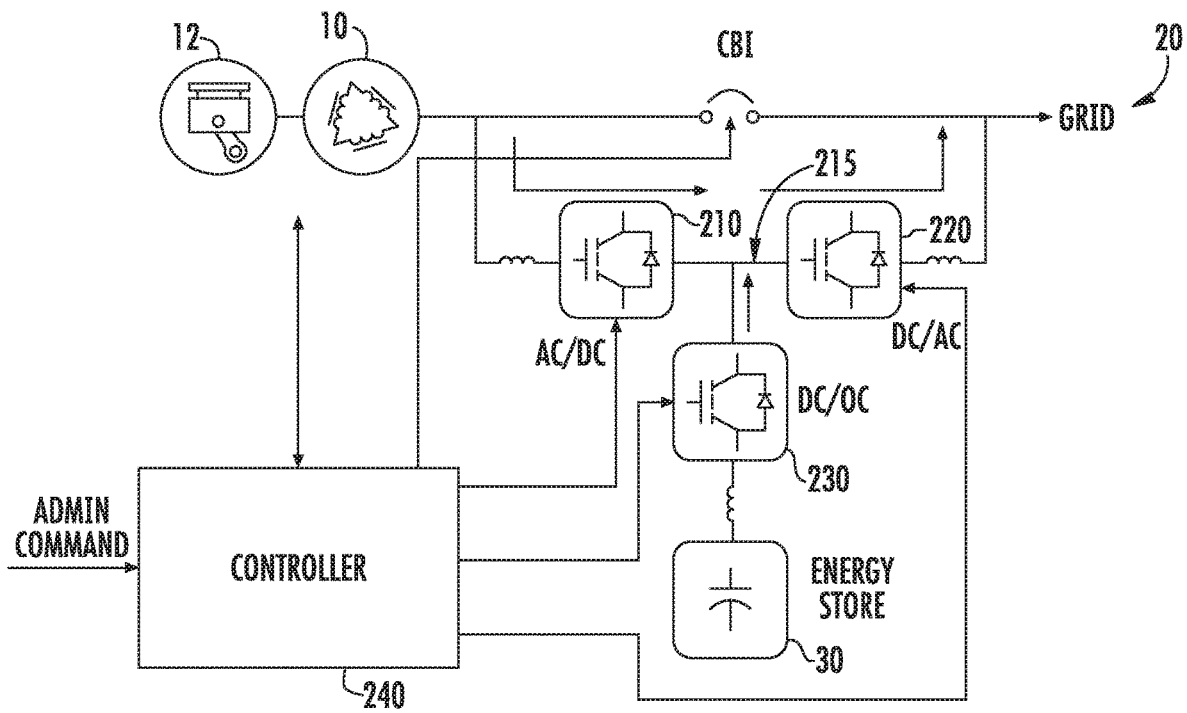
FIG. 2 is a block diagram illustrating apparatus and operations for interfacing a generator to a utility grid according to some embodiments of the inventive subject matter.

Embodiments of the inventive subject matter include systems and methods that allow for more rapid provision of power to a utility grid from a generator. An exemplary system is illustrated in FIG. 2. A generator 10 is driven and by an engine 12 and a contactor CB1 couples and decouples the generator 10 to and from a utility grid 20. The utility grid 20 may generally be fed from a plurality of different generation resources, including non-dispatchable resources (e.g., wind generators, solar arrays and like) and/or dispatchable resources (e.g., diesel powered generators, microturbine generators and the like), and the engine 12 and generator 10 may be used as a dispatchable resource, e.g., commanded by a system administrator to provide power to the utility grid 20 to provide additional capacity in response to fluctuations in demand of users coupled to the utility grid 20 and/or fluctuations in capacity of other resources feeding the utility grid 20.

The system further includes a DC/AC converter 220 configured to be coupled to the utility grid 20 and to support transfer of power between an energy storage device 30 (e.g., a battery, capacitor bank or combination thereof) and the utility grid 20. The energy storage device 30 may have relatively limited capacity, e.g., may store an amount of energy that is only sufficient to provide a desired amount of power to the utility grid 20 for an amount of time sufficient to achieve the rapid generator activation described herein. The energy storage device 30 may be coupled to the DC/AC converter 220 with a DC/DC converter 230 to facilitate the interface between the energy storage device 30 and a DC bus 215 coupled to an input of the DC/AC converter 220 and maximize availability of the energy stored in the energy storage device 30, which may exhibit a significant drop in output voltage as it is discharged. The system further includes an AC/DC converter 210 configured to be coupled to the generator output and to support transfer of power between the generator 10 and the energy storage device 30.

In a first mode of operation, a controller 240 of the system may receive an administrative command to start the engine 12 and to provide a certain amount of power. The engine 12 is cranked and, once the engine 12 starts, the controller 240 causes the DC/AC converter 220 to begin to provide the requested amount of power to the utility grid 20 using the energy stored in the energy storage device 30. The controller 240 may delay providing power from the DC/AC converter 220 because, if the engine 12 fails to start, the relatively small amount of energy stored in the energy storage device 30 may be quickly depleted and may further destabilize the utility grid 20 with its sudden removal.

The AC/DC converter 210 coupled to the generator 10 starts loading the generator 10 as it is ramping up its speed and synchronizing with the utility grid 20. The loading of the generator 10 continues until the current delivered from the energy storage device 30 is approximately zero. The AC/DC converter 210 maintains the loading of the generator 10 through this path (i.e., through the AC/DC converter 210 and the DC/AC converter 220) such that the current from the energy storage device 30 is zero. Thus, the required power output is being supported by the generator 10 even while the generator 10 is coming up to speed and synchronizing with the utility grid. This can reduce or minimize the amount of stored energy required to support the requested power output before contactor CB1 connects the generator 10 directly to the utility grid 20.

After the controller 240 causes the contactor CB1 to close, the DC/AC converter 220 can reduce its power delivered as the generator 10 takes on the load. The system can thus provide the output power requested starting at the time the generator 10 begins to run to the time that the generator 10 completely takes over the load. Overloading of the generator 10 can be avoided because the AC/DC converter 210 may be operated to maintain zero current in the energy storage device 30. As the DC/AC converter 220 reduces the amount of power it delivers to the utility grid 20, the AC/DC converter 210 can implement a corresponding reduction in power it transfers from the generator 10 such that the energy store current remains zero.

Figure 3:
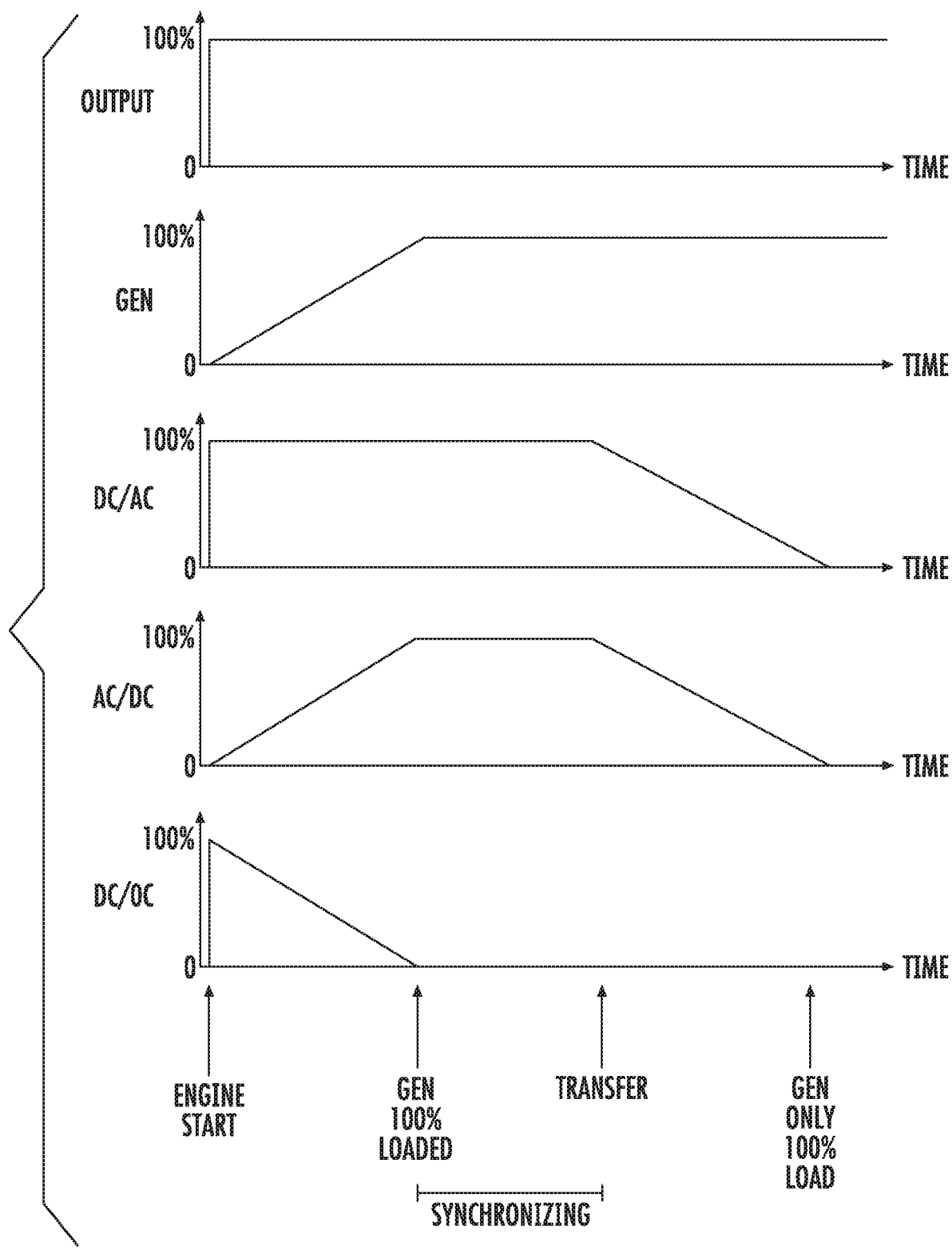
FIG. 3 is a graph illustrating operations for coupling a generator to a utility grid according to some embodiments of the inventive subject matter.
Figure 4:
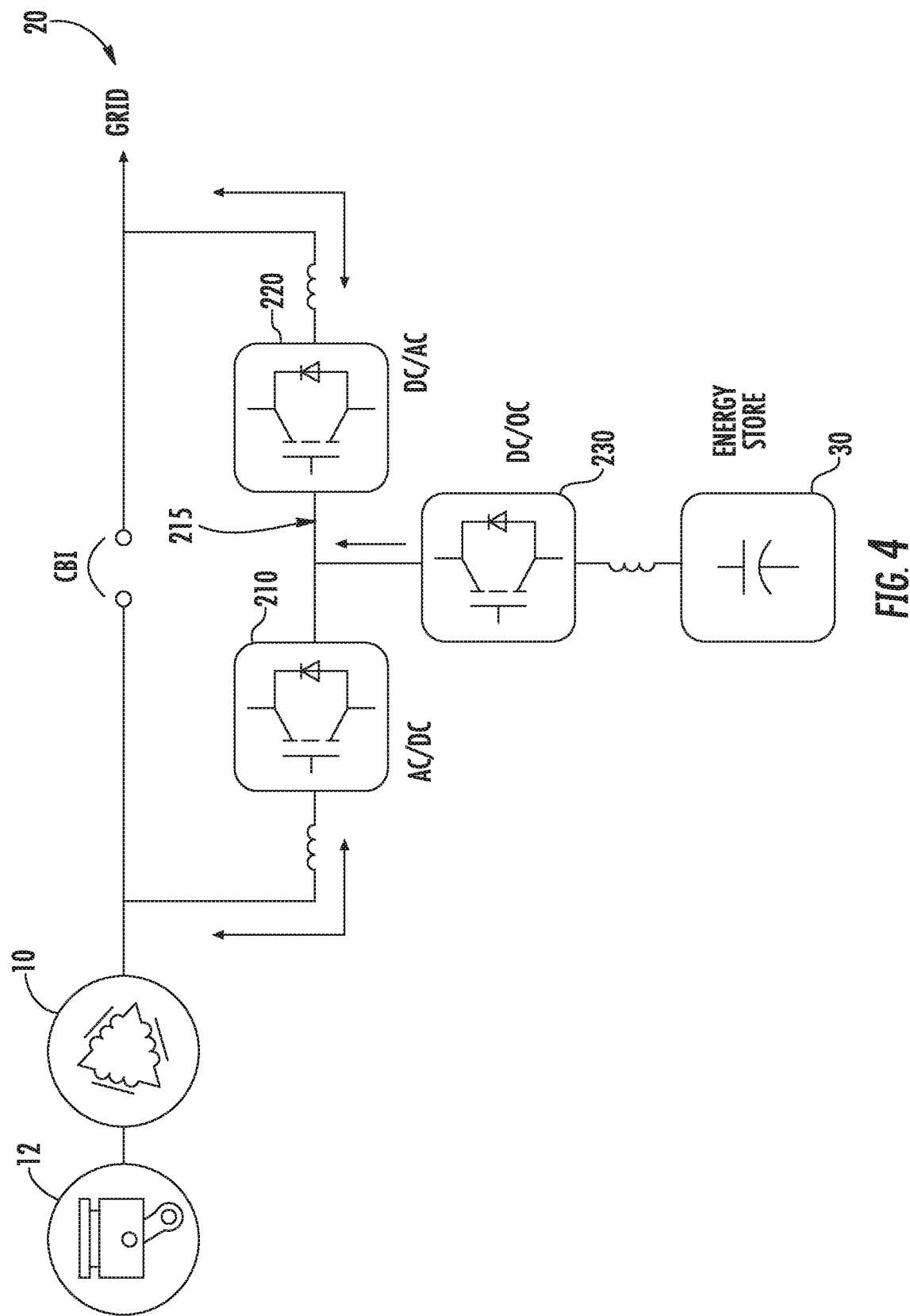
FIG. 4 is a block diagram illustrating apparatus and operations for interfacing a generator to a utility grid according to further embodiments of the inventive subject matter.

FIG. 3 illustrates an example process, showing loading of the generator 10 and transfer currents of the DC/AC converter 220, the AC/DC converter 210 and the DC/DC converter 230 during the engine start, synchronization and load transfer phases. Once the generator has taken on 100% of the output power requirement, the controller 240 can cause the system to transition to a second mode of operation in which both the DC/AC converter 220 and the AC/DC converter 210 can be used provide support to the utility grid 20 from the energy storage device 30 in response to frequency and voltage deviations in a manner along the lines described in U.S. Pat. No. 9,312,699 to Taimela et al. In particular, referring to FIG. 4, this mode may involve operating the AC/DC converter 210 and/or the DC/AC converter 220 to source and sink current to and from the utility grid 20, using the energy storage device 30 to help address step increases and decreases in load by bidirectionally transferring power between the utility grid 20 from the energy storage device 30 via the AC/DC converter 210 and/or the DC/AC converter 220.

According to further aspects, to support engine starting, the AC/DC converter 210 may also be operated to drive the generator 10, i.e., operate it as a motor, to assist starting of the engine 12 and/or aiding the engine 12 in more quickly causing the generator 10 to achieve synchronous speed. This technique can facilitate engine starting in cases where the engine starting battery fails. Starting battery failure due to inadequate maintenance is a common failure mode.

The system may be energy storage agnostic. For example, the energy storage device 30 may include electrochemical storage, such as lithium-ion batteries and/or ultracapacitors (electro-chemical double layer capacitors) and/or other types of storage systems, such as a flywheel-based or compressed air based storage system. The selection and sizing of the energy storage may be based on the application.

With increased capacity in the energy storage device 30, the system may also be used for peak shaving operations. As noted above, the AC/DC converter 210 and the DC/AC converter 220 may be bidirectional and provide power to and absorb power from the utility grid 20. Since the AC/DC converter 210, the DC/AC converter 220 and the generator 10 are capable of providing 100% rated power, the total system may provide on the order of 300% rated power (excluding overload ratings) of the generator 10. For example, in this mode, with the contactor CB1 closed, the energy storage device 30 may supply 200% of the power by simultaneously feeding the utility grid 20 through the AC/DC converter 210 and DC/AC converter 220 at 100% of their respective ratings, while the generator 10 provides 100% of its power rating to the utility grid 20.

Figure 5:
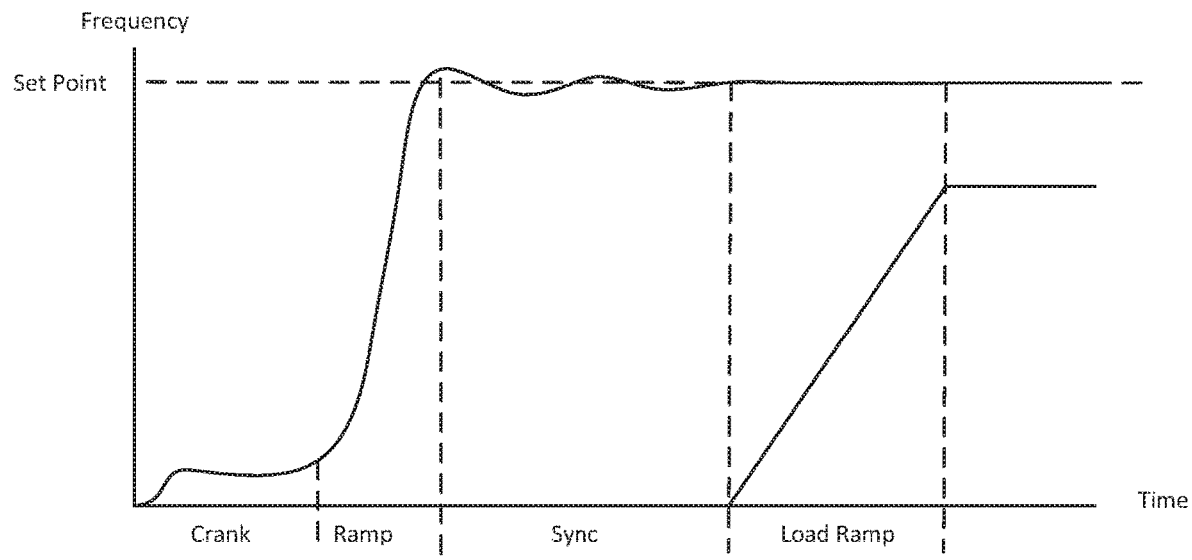
FIG. 5 is a graph illustrating conventional starting and synchronization of a generator.

According to further embodiments of the inventive subject matter, apparatus along the lines described above may also be used to improve generator synchronization by using an energy source/sink to provide a supplemental torque to a generator rotor. A typical starting of a dispatchable source is shown in FIG. 5. The first interval is a crank time for starting the engine. If the engine fails to start, this interval may be extended by one or more additional retries. Once the engine starts, the engine may be ramped up to synchronous speed over the next 10 seconds. Matching the generator output to the utility grid in voltage, frequency and phase may require 15 seconds. This time to synchronize the generator to the grid can be unpredictably extended, especially if the grid itself is fluctuating. Once the generator is matched to the utility grid, the generator output is connected directly to the utility grid. As shown, the generator loading may be gradually increased to 100% over the next 30 seconds. Thus, the illustrated process to bring the generator on line may take approximately 60 seconds or more if the engine starts on the first attempt.

The synchronous generator is an electrical-mechanical system driven by a prime mover. Within the generator, the rotor has a fixed magnetic field that creates a rotating magnetic field when the rotor is turning in the presence of a magnetic field. This rotor must be turned at synchronous speed to produce the three-phase voltages of the power system. The rotor is connected to a prime mover by a mechanical shaft that provides mechanical energy for conversion to electrical energy.

Prior to closing the generator breaker during synchronization, the angular velocity of the rotation magnetic field and therefore the frequency of the voltage induced is governed by the rotor speed. To achieve synchronization, the speed of the prime mover must be tightly controlled to achieve a match in voltage, frequency and phase corresponding to the grid. Recommended synchronization limits for generators are +/−10 degrees phase angle, 0 to +5% voltage and +/−0.067 Hz slip rate, where slip rate is the difference between generator frequency and the grid frequency. When the generator frequency is greater than the grid frequency, the slip rate is positive. Tight control is desirable to limit transient torques and cumulative fatigue damage to the generator and prime mover over the life of the system.

Transient torques can arise from mismatch of the generator output and the grid at the moment of closing the breaker connecting the generator directly to the grid. Before the breaker closure, the prime mover controls the output of the generator. After the breaker closure, the grid will force the generator to match the grid. The rotating masses of the rotor and the prime mover have to change speed and position nearly instantaneously to match the grid. The transient torque required to bring the rotor and prime mover into synchronism with the grid may be acceptable if the mismatch is small. If the mismatch is large, a large transient torque may be applied to the mechanical systems to accelerate or decelerate the rotating masses to match the grid. If the phase angle between the grid and the generator is excessively large, greater torques will be applied to the rotor to snap the rotor and prime mover position into phase with the grid. These transient torques can cause considerable stress and result in a mechanical failure due to application of a sufficiently large transient torque or mechanical failure due to an accumulation of mismatch events.

Figure 6:
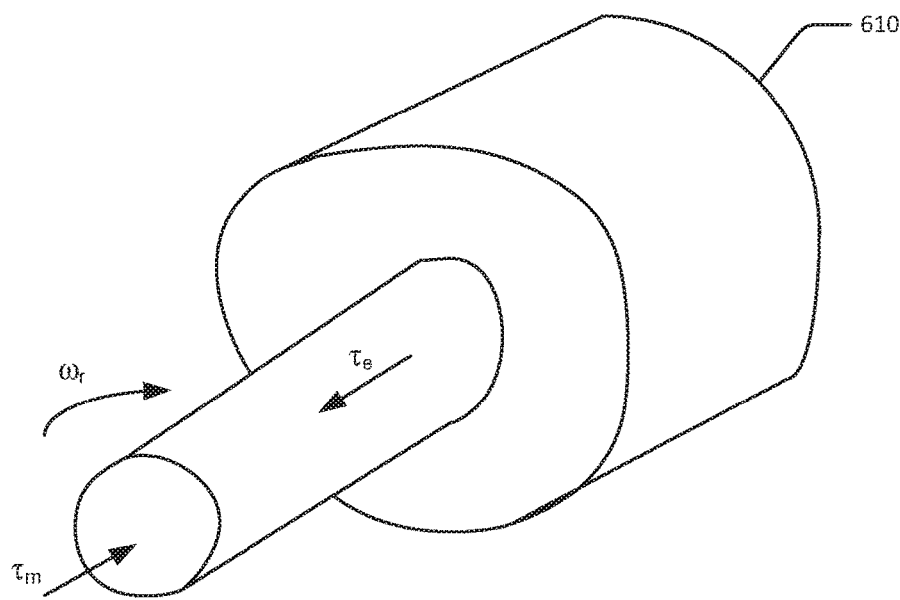
FIG. 6 illustrates application of an auxiliary electrical torque to a generator rotor to aid synchronization according to some embodiments of the inventive subject matter.

Illustrated in FIG. 6, the prime mover provides a mechanical torque $\tau_m$ to rotate a rotor 10 of a generator. The rotational speed $\omega_r$ of the rotor controls the electrical frequency of the generator output. According to some embodiments of the inventive concept, the mechanical torque $\tau_m$ is supplemented with electrical torque $\tau_e$ that is provided by loading or motoring the generator prior to direct connection to the grid. This supplemental electrical torque $\tau_e$ can be used to achieve finer and more rapid control over the rotational speed than the engine controls can achieve alone.

Some embodiments of the inventive concept may be particularly advantageous in large generator systems where it may be more difficult to finely control the rotational speed of the generator. Large generators are normally operated with no loading of the generator during the synchronization process.

Figure 7:
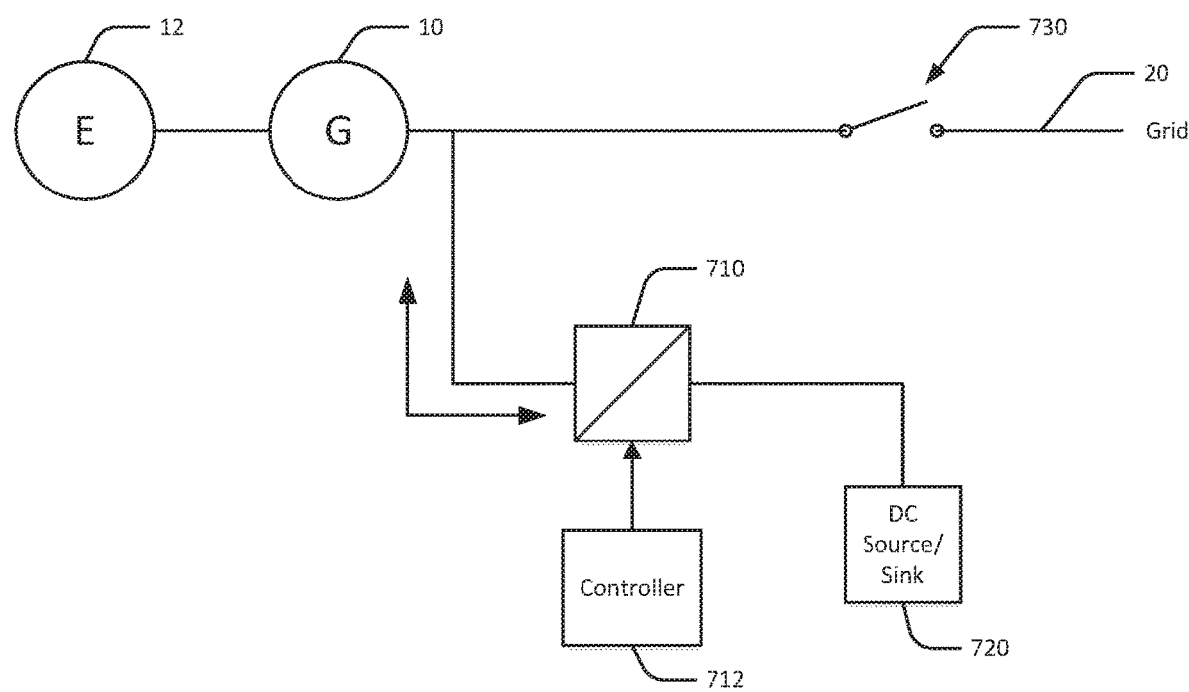
FIG. 7 is a block diagram illustrating apparatus and operations for interfacing a generator to a utility grid using a supplemental electrical torque according to some embodiments of the inventive subject matter.

Referring to FIG. 7, according to some embodiments, a supplemental electrical torque may be provided using a converter 710 having a first port coupled to the output of a generator 10 (driven by a prime mover 12) and a second port coupled to a DC source/sink 720 and controlled by a controller 712. The converter 710 may be bidirectional and may be used to load the generator 10 or to drive the generator 10 as a motor. When the converter 710 loads the generator 10, the generator's rotor will decrease in speed to degree corresponding to the magnitude of loading. Similarly, when the converter 710 drives the generator 10 as a motor, the generator rotor will increase in speed an amount corresponding to the magnitude of the drive. In this way, the rotor speed is dependent on the combination of mechanical torque $\tau_m$ and the supplemental electrical torque $\tau_e$ applied by action of the converter 710.

Prior to bringing the generator 10 on line, a switch 730 for coupling the generator 10 directly to the grid is open. During a synchronization process with the switch 730 open, the voltage, frequency, phase and slip are monitored. When the prime mover 12 achieves a rotational speed that produces the desired frequency output from the generator 10, the controller 712 of the converter 710 can change the total torque supplied to the rotor of the generator 10. This change in total torque may be supplied as continuous and/or pulse load changes. The controller 712 of the converter 710 can monitor the generator output and the grid and make fine adjustments to the rotor speed by changing the total torque by either loading or motoring the generator 10 during the synchronization interval. This change in total torque will alter the frequency and enable faster frequency and phase lock with the grid. When sufficient phase and frequency lock is achieved, the switch 730 may be closed to directly connect the generator 10 to the grid.

The adjustment in total torque during the synchronization process can be advantageous in applications in which the grid frequency is changing. The changing grid frequency may be encountered, for example, when the grid is under stress as a result of load exceeding current generation capacity requiring rapid dispatch of additional generation assets. Some embodiments can control the total torque applied to the rotor, allowing for rapid changes that enable tracking of a varying grid frequency and achieving reduced synchronization times.

Figure 8A:
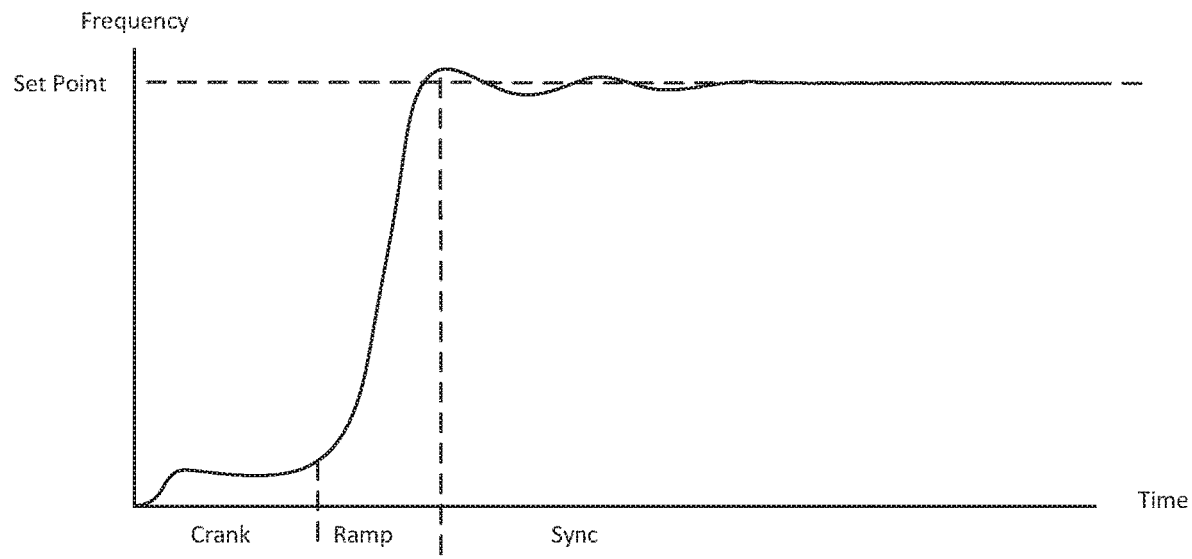
FIGS. 8A and 8B illustrate potential performance differences between conventional generator starting operations and operations according to some embodiments of the inventive subject matter.

The selectively loading/unloading of the generator during the synchronization interval can be particularly advantageous for a generator that is subject to stability (oscillation) issues at no or low load, such as generator having a large natural gas engine as its prime mover. This instability is illustrated in FIG. 8A, which shows how a generator output may overshoot a frequency set point and then oscillate around the frequency set point. This oscillation can be caused by the inability of the engine controls to achieve fine throttle control of an unloaded engine. The control system's "hunting" for the desired frequency can hamper the ability to synchronize with the grid.

Figure 8B:
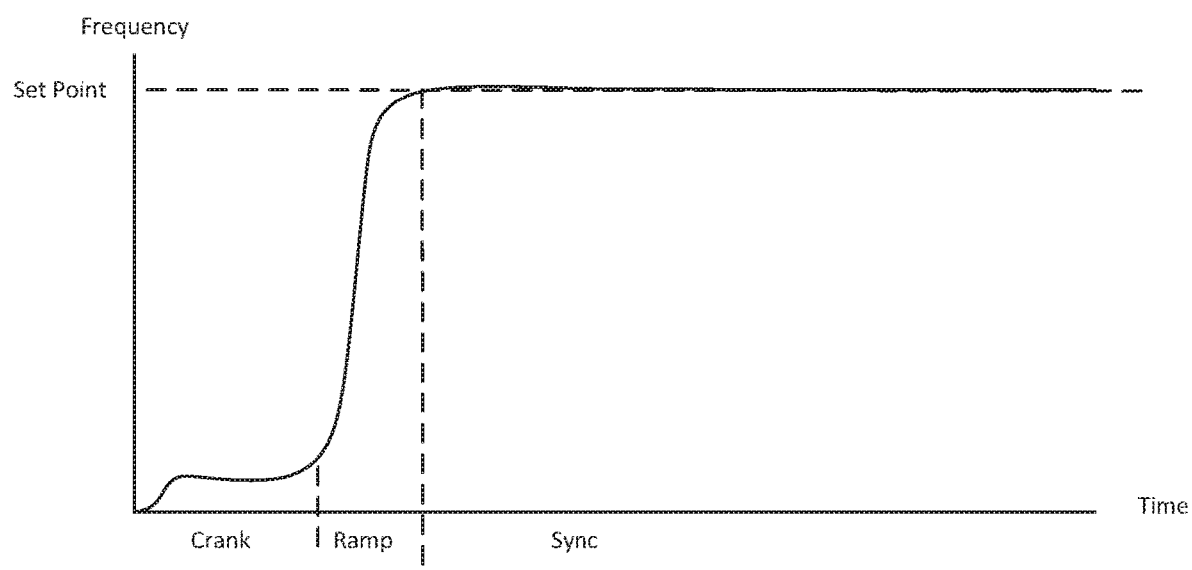

FIG. 8B illustrates the result of preloading the generator prior using a converter as describe above to improve the ability to connect it to the grid. Referring to FIG. 7, the preload can be achieved by operating the converter 710 to load the generator 10 and providing the power received by the converter 710 to the DC source/sink 720.

Figure 9:
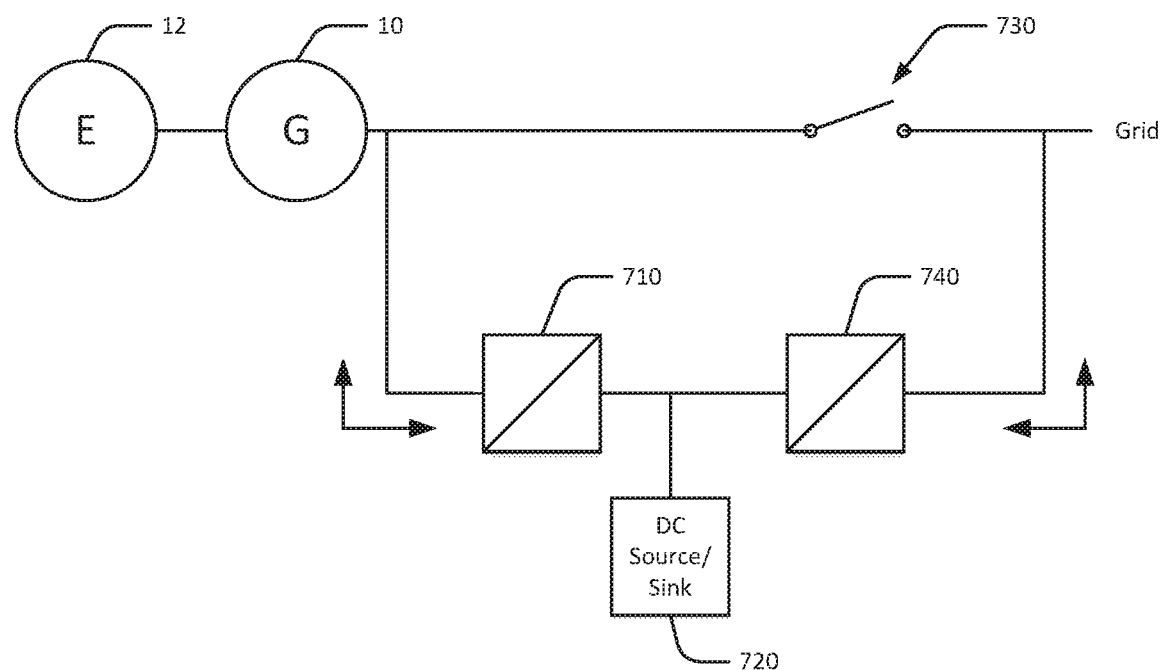
FIGS. 9-11 are block diagrams illustrating various apparatus and operations for interfacing a generator to a utility grid using a supplemental electrical torque according to further embodiments of the inventive subject matter.

The DC source/sink 720 can take any of a number of different forms. Referring to FIG. 9, a second converter 740 may be provided having a first port coupled to the DC source/sink 720 and a second port coupled to grid. Both of the first and second converters 710, 740 can be bidirectional and can provide current to or receive current from each port. In the mode where the generator 10 is loaded, the first converter 710 loads the generator 10 and supplies power to the DC source/sink 720. The second converter 740 can maintain a DC voltage on the DC source/sink 720 and, if the DC voltage rises as a result of current into the node, the second converter 740 can receive the excess current and supply it to the grid. When the generator 10 is driven as a motor, the first converter 710 supplies power to the generator from the DC source/sink 720. The second converter 740 can maintain the DC voltage on the DC source/sink 720 and if the DC voltage falls as a result of the current out of the DC node, the second converter 740 can maintain the DC voltage by drawing power from the grid.

Figure 10:
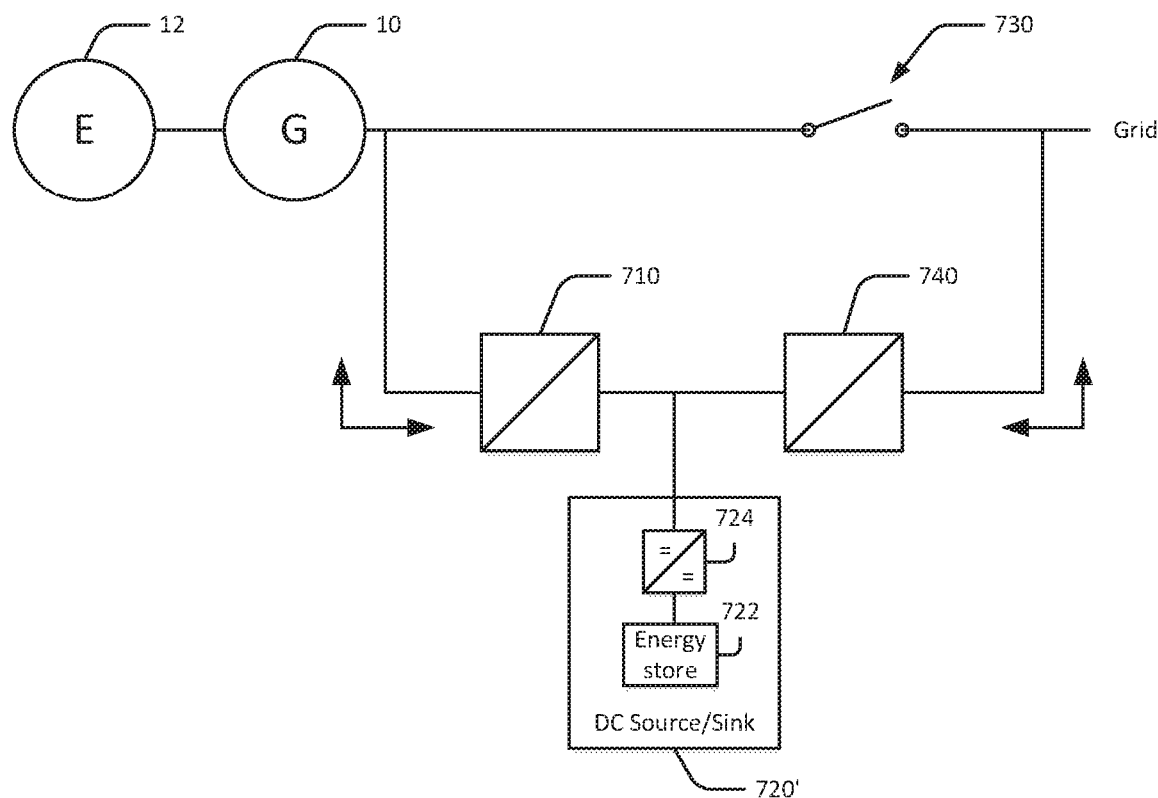

Referring to FIG. 10, a DC source/sink 720' may include energy storage 722 in form of, for example, ultra-capacitors. The energy storage 722 may be coupled to the DC link between the first and second converters 710, 740 by a DC/DC converter 724 that can support better utilization of the stored energy of the ultra-capacitors. In some embodiments, the energy storage 722 may include an electrochemical battery alone or in combination with ultra-capacitors. A battery can enhance the ability to provide substantial power to either the first converter 710 or the second converter 740. In a first mode, the second converter 740 can utilize the battery to provide power to the grid in advance of the generator 10 starting and during the synchronization interval. In a second mode, the first converter 710 can utilize the stored energy to drive the generator 10 as a motor.

This may be beneficial when the prime mover 12 is an engine having a long crank cycle before starting, as is typical for large natural gas engines. These engines are conventionally started using relatively small starter motors operated from a relatively small DC battery. In an engine in which a minimum of revolutions the main engine must be achieved before ignition can be successful, the first converter 710 can be used to drive the generator 10 as a motor (with much greater capacity than the starter motor) to achieve the required number of main engine revolutions in a shorter time interval. In some embodiments, the first and second converters 710, 740 can be operated in the first and second modes simultaneously.

Figure 11:
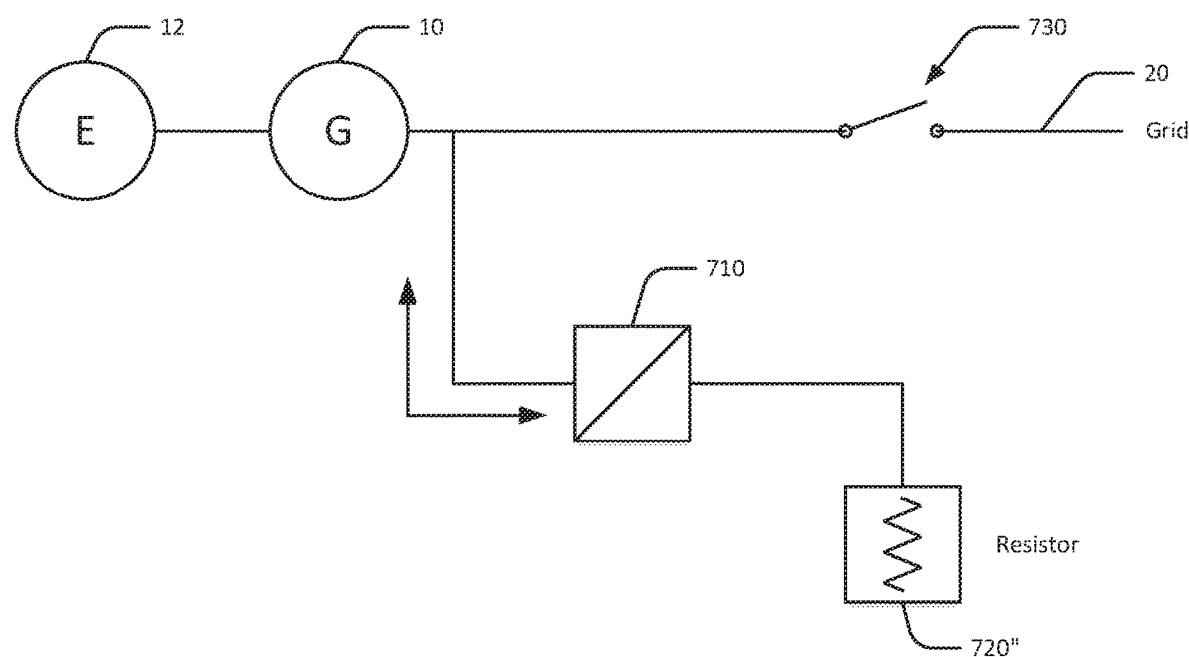

According to further embodiments, similar results can be achieved by resistive loading of the generator. Referring to FIG. 11, a converter 710 has a first port connected to a generator 10 and a second port connected to a current sink 720" in the form of a resistor. The converter 710 can control the voltage across the resistor, thus effectively loading the generator 10. The generator 10 can be loaded to a base load. The loading can be increased to slow the rotor speed of the generator 10 or can be decreased to increase the rotor speed of the generator 10. Such an approach can be used to effect a similar change in loading to achieve faster synchronizing to the grid along the lines discussed above.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
   a first converter having a first port coupled to an output of a generator;
   a second converter having a first port coupled to a second port of the first converter and a second port coupled to a utility grid;

a switch configured to couple the output of the generator to the utility grid and thereby bypass the first and second converters, such that the generator is configured to be indirectly coupled to the utility grid via the first and second converter and to be directly coupled to the utility grid by the switch; and a controller configured to cause the first and second converters to provide power to the utility grid from the generator responsive to a command to start an engine that drives the generator and to close the switch to directly connect the generator to the utility grid responsive to a state of the generator meeting a predetermined criterion after the engine has started, wherein the controller is configured to start the engine responsive to the command, wherein the predetermined criterion comprises a synchronization of the generator to the utility grid.

2. The system of claim 1, wherein the predetermined criterion comprises a synchronization of the generator to the utility grid.

3. The system of claim 1, wherein the controller is further configured to maintain substantially zero current transfer between the energy storage device and the DC bus after the generator is providing the predetermined amount of power.

4. The system of claim 1, wherein the controller is configured to cause the first and second converters to provide a first power output level to the utility grid from the generator before the state of the generator meets the predetermined criterion and to close the switch to directly connect the generator to the utility grid to continue to provide the first power output level to the utility grid responsive to the state of the generator meeting the predetermined criterion.

5. The system of claim 1, wherein the controller is further configured to cause the first converter to apply a torque to a rotor of the generator responsive to the command to start the engine to aid starting of the engine.

6. A system comprising:
a first converter having a first port coupled to an output of a generator;
a second converter having a first port coupled to a second port of the first converter and a second port coupled to a utility grid;
a switch configured to couple the output of the generator to the utility grid and thereby bypass the first and second converters, such that the generator is configured to be indirectly coupled to the utility grid via the first and second converter and to be directly coupled to the utility grid by the switch; and
a controller configured to cause the first and second converters to provide power to the utility grid from the generator responsive to a command to start an engine that drives the generator and to close the switch to directly connect the generator to the utility grid responsive to a state of the generator meeting a predetermined criterion after the engine has started, wherein the second port of the first converter is coupled to the first port of the second converter by a DC bus and wherein the controller is configured to operate the switch and the first and second converters in a first mode to provide power to the utility grid from the generator before the generator is synchronized to the utility grid and to operate the switch and the first and second converters in a second mode wherein an energy storage device coupled to the DC bus sources and sinks current to and from the utility grid via at least one of the first and second converter circuits in response to load changes on the utility grid while the generator is providing power to the utility grid.

7. The system of claim 6, wherein the switch is open in the first mode and wherein the switch is closed in the second mode.

8. A method comprising:
coupling an output of a generator to a utility grid via a series combination of a first converter coupled to the generator and a second converter coupled between the first converter and the utility grid;
responsive to a command to start an engine that drives the generator, starting the engine responsive to the command and providing power to the utility grid from the generator output via the first and second converters before a state of a generator meets a predetermined criterion after the engine has started; and
closing a switch to directly connect the generator to the utility grid responsive to the state of the generator meeting the predetermined criterion,
wherein the first converter is coupled to the second converter by a DC bus and wherein the method further comprises causing the second converter to provide power to the utility grid from an energy storage device coupled to the DC bus until the engine has started and the generator provides a predetermined amount of power.

9. The method of claim 8, wherein the predetermined criterion comprises a synchronization of the generator to the utility grid.

10. The method of claim 8, further comprising maintaining substantially zero current transfer between the energy storage device and the DC bus after the generator is providing the predetermined amount of power.

11. The method of claim 8, wherein providing power to the utility grid from the generator output via the first and second converters before a state of a generator meets the predetermined criterion comprises providing a first power output level to the utility grid and wherein closing the switch to directly connect the generator to the utility grid responsive to the state of the generator meeting the predetermined criterion is followed by providing the first power output level to the grid from the generator.

12. The method of claim 8, wherein providing power to the utility grid from the generator output via the first and second converters before a state of a generator meets a predetermined criterion after the engine has started is preceded by causing the first converter to apply a torque to a rotor of the generator responsive to the command to start the engine to aid starting of the engine.

13. A method comprising:
coupling an output of a generator to a utility grid via a series combination of a first converter coupled to the generator and a second converter coupled between the first converter and the utility grid;
responsive to a command to start an engine that drives the generator, providing power to the utility grid from the generator output via the first and second converters before a state of a generator meets a predetermined criterion after the engine has started; and
closing a switch to directly connect the generator to the utility grid responsive to the state of the generator meeting the predetermined criterion, wherein the first converter is coupled to the second converter by a DC bus and wherein the method further comprises operating the switch and the first and second converters in a first mode to provide power to the utility grid from the generator before the generator is synchronized to the utility grid and operating the switch and the first and second converters in a second mode wherein an energy storage device coupled to the DC bus sources and sinks current to and from the utility grid via at least one of the first and second converter circuits in response to load changes on the utility grid while the generator is providing power to the utility grid.

14. The method of claim 13, wherein the switch is open in the first mode and wherein the switch is closed in the second mode.

* * * * *